United States Patent [19]
Kawasaki

[11] Patent Number: 6,040,940
[45] Date of Patent: Mar. 21, 2000

[54] REFLECTING FLUORESCENCE MICROSCOPE

[75] Inventor: Kenji Kawasaki, Musashimurayama, Japan

[73] Assignee: Olympus Optical Co., Ltd., Tokyo, Japan

[21] Appl. No.: 09/241,050

[22] Filed: Feb. 1, 1999

[30] Foreign Application Priority Data

Feb. 4, 1998 [JP] Japan ................... 10-022451

[51] Int. Cl.[7] ............... G02B 21/06; G02B 21/16
[52] U.S. Cl. ................ 359/389; 359/377; 359/385; 359/388; 250/458.1
[58] Field of Search ................... 359/389, 388, 359/385, 377, 350, 355, 361; 250/458.1, 461.1, 461.2

[56] References Cited

U.S. PATENT DOCUMENTS

| | | |
|---|---|---|
| 3,971,951 | 7/1976 | Rikukawa et al. ............ 250/458.1 |
| 4,947,198 | 8/1990 | Inanobe et al. . |
| 5,136,427 | 8/1992 | Sugawara . |
| 5,371,624 | 12/1994 | Nagano et al. ............ 359/389 |

FOREIGN PATENT DOCUMENTS

| | | |
|---|---|---|
| 3-39712 | 4/1991 | Japan . |
| 6-109984 | 4/1994 | Japan . |
| 9-292570 | 11/1997 | Japan . |
| 9-292572 | 11/1997 | Japan . |

*Primary Examiner*—Jon Henry
*Attorney, Agent, or Firm*—Pillsbury Madison & Sutro LLP

[57] ABSTRACT

A reflecting fluorescence microscope has a reflecting fluorescence illumination optical system, an observation optical system, and a specimen supporting means for mounting a specimen. In this case, an optical member for attenuating excited light supplied from the reflecting fluorescence illumination optical system is interposed between the specimen and the specimen supporting means. Thus, an observation in which little auto-fluorescent light is produced and a contrast is good can be carried out.

17 Claims, 11 Drawing Sheets

REFLECTING FLUORESCENCE MICROSCOPE

BACKGROUND OF THE INVENTION

1. Field of the Invention

This invention relates to a microscope equipped with a reflecting fluorescence illumination optical system, and in particular, to a stereomicroscope and a reflecting fluorescence microscope which are designed to prevent a reduction in contrast of an observation image, caused by autofluorescent light emitted from a stage mounting a specimen and the optical system of a transmitting illumination device in a fluorescence observation.

2. Description of Related Art

A stereomicroscope, in contrast with an ordinary optical microscope, is very long in working distance and has the feature of being usable for a stereoscopic observation. This feature is utilized for observing a specimen.

As shown in FIG. 1, a conventional stereomicroscope, as its observation optical system, includes an objective lens 1, zoom lenses 2R and 2L, imaging lenses 3R and 3L, and eyepieces 4R and 4L. A specimen 7 is magnified by the objective lens 1 and the zoom lenses 2R and 2L, and images Q and Q' of the specimen 7 are formed by the imaging lenses 3R and 3L so that the images Q and Q' are observed through the eyepieces 4R and 4L.

Of the observation optical system, the zoom lenses 2R and 2L, the imaging lenses 3R and 3L, and the eyepieces 4R and 4L are arranged in pairs for the right and left eyes. An observation optical axis 5R for the zoom lens 2R, the imaging lens 3R, and the eyepiece 4R which constitutes an observation optical path R for the right eye, as well as an observation optical axis 5L for the zoom lens 2L, the imaging lens 3L, and the eyepiece 4L which constitutes an observation optical path L for the left eye, is decentered with respect to an optical axis 6 of the objective lens 1.

For the observation of the specimen, such a stereomicroscope has been used to observe the transmitted image or reflected image of the specimen in most cases. Hence, a transparent member, such as glass, has been used for a stage mounting the specimen 7 when the transmitted image of the specimen is observed. This is because it is necessary to make an arrangement so that the specimen interposed between the object lens and the stage can be illuminated from the opposite side of the object lens with respect to the specimen. Where the reflected image of the specimen is observed, on the other hand, it is only necessary to illuminate the specimen from the objective side, and thus an opaque member has been used as the stage.

Illumination devices vary with observation techniques. A transmitting illumination device used when the transmitted image is observed varies in technique from a simple structure to a complicated illumination system with a means for visualizing a transparent specimen. The stereomicroscope shown in FIG. 1 is a stereomicroscope equipped with a transmitting illumination device disclosed in Japanese Utility Model Preliminary Publication No. Hei 3-39712. In FIG. 1, the optical system of a transmitting illumination device A is composed of a light source 9, a collector lens 10, a Fresnel lens 11, and a deflection mirror 12. Illumination light emitted from the light source 9 which is a halogen lamp is collected by the collector lens 10 and is incident on the Fresnel lens 11. The illumination light is changed to a light beam such that the specimen is almost uniformly illuminated by the Fresnel lens 11, and after being reflected by the deflection mirror 12, reaches the specimen 7 through a glass stage 8. Here, if the light beam illuminating the specimen is spread, the specimen can be obliquely illuminated by rotating the deflection mirror 12, so that a transparent specimen can be visualized by so-called oblique illumination. In the transmitting illumination device of such a conventional stereomicroscope, it is customary to use inexpensive resin material for the Fresnel lens 11 in order to keep cost to a minimum.

Where the reflected image of the specimen is observed, on the other hand, a reflecting illumination device in which an annular illumination light source is placed around the objective lens, or a reflecting illumination device such as that shown in FIG. 2 is used. A reflecting illumination device B shown in FIG. 2 uses a light guide fiber, and its optical system is constructed with a light source 14, a collector lens unit 15, a light guide fiber 16, and an illumination lens unit 17 whose illumination range is variable.

Illumination light emitted from the light source 14 is rendered incident on an entrance end face 16a of the light guide fiber 16 by the collector lens unit 15. An exit end face 16b of the light guide fiber 16 is situated close to the specimen so that the illumination light passing through the light guide fiber 16 and emerging from the exit end face 16b is radiated from an oblique direction toward the specimen 7 by the illumination lens unit 17. In the stereomicroscope of FIG. 2, the transmitted image of the specimen 7 need not be observed, and thus an opaque member is used for a stage 13.

Recently, in the field of biology, fluorescent pigment referred to as GFP (green fluorescent protein) has been come into prominent use. This pigment, in contrast with conventional fluorescent pigment, has the features that brightness is good and little bleaching is caused, and in addition, has the advantage of inflicting little damage on a living body. Consequently, in the fields of genetics and embryology, comprehensive research on the pigment is being done in such a way that the GFP pigment is applied, for example, to rats and fruit flies.

Of various specimens stained with the GFP pigment, specimens of rats and fruit flies such as in the foregoing are too large for optical microscopes and thus it is difficult to observe them with the optical microscopes. Hence, the needs of microscopes in which fluorescence observations can be made not only in a microregion but also in a macroregion are increased, and special attention has been devoted to stereomicroscopes for fluorescence observation in which a stereomicroscope having a long working distance and allowing a stereoscopic observation to be made is combined with a reflecting fluorescence device. Naturally, in ordinary fluorescence microscopes as well as in stereomicroscopes, applications of the GFP to fluorescence observations are becoming popular.

With a background of such needs, stereomicroscopes for making fluorescence observations, in addition to reflection observations and transmission observations, have recently been put to practical use. An example of a stereomicroscope which allows the fluorescence observation to be made is shown in FIG. 3. In this figure, like numerals are used for like members with respect to FIG. 1, and a detailed description of these members is omitted.

A conventional stereomicroscope in which the fluorescence observation can be made, as shown in FIG. 3, is provided with a transmitting illumination device C and a reflecting fluorescence illumination device D for fluorescence observation. The optical system of the transmitting illumination device C has members in common with that of the transmitting illumination device A, and includes the light source 9, a collector lens 18, a filter 19, a diffusion member 20, the deflection mirror 12, and the Fresnel lens 11. Illumination light emitted from the light source 9, after being rendered nearly parallel by the collector lens 18, passes through the filter 19, is diffused by the diffusion member 20, and is reflected by the deflection mirror 12 toward the specimen 7. The illumination light reflected by the deflection mirror 12 is changed to a light beam such that the specimen 7 is almost uniformly illuminated by the Fresnel lens 11. Where a color temperature is adjusted, the filter 19 is introduced into the optical path when necessary. On the other hand, the optical system of the reflecting fluorescence illumination device D includes a light source 21, an illumination lens 22, an excitation filter 23, a dichroic mirror 24L, and an absorption filter 25L.

Excited light emitted from the light source 21 which is a mercury lamp is introduced into the excitation filter 23 by the illumination lens 22. The excitation filter 23 selectively transmits only excited light with wavelengths required to excite the specimen 7, of the light from the light source 21. The excited light transmitted through the excitation filter 23 is reflected by the dichroic mirror 24L toward the zoom lens 2L and irradiates the specimen 7 through the zoom lens 2L and the objective lens 1.

The specimen 7 is such that because of the irradiation of the excited light, fluorescent light is emitted from parts stained by the fluorescent pigment. The fluorescent light originating from the specimen 7 is collected by the objective lens 1 and is introduced into the observation optical path R for the right eye and the observation optical path L for the left eye. The fluorescent light introduced into the observation optical path L for the left eye passes through the zoom lens 2L, is transmitted through the dichroic mirror 24L, and is selectively absorbed by the spectral characteristic of the absorption filter 25L so that only fluorescent light with particular wavelengths is transmitted therethrough. The fluorescent light with particular wavelengths is imaged by the imaging lens 3L and is observed as a fluorescent image through the eyepiece 4L. The fluorescent light introduced into the observation optical path R for the right eye, on the other hand, passes through the zoom lens 2R and a dichroic mirror 24R and reaches an absorption filter 25R. The fluorescent light transmitted through the absorption filter 25R with the same behavior as the absorption filter 25L is imaged by the imaging lens 3R and is observed as a fluorescent image through the eyepiece 4R.

The fluorescent light, in contrast with light in an ordinary reflection or transmission observation, is very low in intensity, and thus in various microscopes used for the fluorescence observation, irrespective of the stereomicroscopes in which the fluorescence observation can be made, it is very important to enable the fluorescent image of the specimen to be observed with a good contrast.

Thus, Japanese Patent Preliminary Publication No. Hei 9-292572 is such that a reflecting surface is provided below a specimen and thereby excited light transmitted through the specimen is reflected by the reflecting surface and illuminates again the specimen. By such an arrangement, the intensity of the excited light is doubled and a bright fluorescent image can be observed. On the other hand, Japanese Patent Preliminary Publication No. Hei 9-292570 proposes the means that in the transmitting fluorescence microscope, a long-wavelength cutoff filter and a short-wavelength cutoff filter are interposed between a specimen and a condenser lens and between the specimen and an objective lens, respectively. The long-wavelength cutoff filter prevents auto-fluorescent light produced by an illumination optical system from entering the objective lens, while the short-wavelength cutoff filter prevents excited light from entering the objective lens. Consequently, the amount of auto-fluorescent light superposed on the fluorescent image of the specimen can be diminished so that the fluorescent image with a good contrast is obtained.

Since each of conventional stereomicroscopes in which the fluorescence observation can be made, such as those mentioned above, is designed so that the fluorescence observation and the transmission observation are carried out, it is very useful and effective for the observation of a transparent specimen. The conventional stereomicroscope in which the fluorescence observation can be made, however, is nothing but a stereomicroscope in which the reflecting fluorescence illumination device D is merely added to the conventional stereomicroscope for transmission observation such as that shown in FIG. 1. Hence, a good fluorescence observation is not always carried out.

In other words, the conventional stereomicroscope in which the fluorescence observation can be made is such that the reflecting fluorescence illumination device is added to the stereomicroscope for transmission observation, and thus, for the glass stage, the lens member, and the diffusion member, optical members used in the conventional stereomicroscope for transmission observation have been used as they are. Specifically, from the viewpoint that manufacturing cost is kept to a minimum, an inexpensive green glass plate is used for the glass stage and resin materials are used for the lens member and the diffusion member of the transmitting illumination device.

However, where these optical members are illuminated with excited light transmitted through the specimen or radiated around the specimen, they have the drawback of considerably producing auto-fluorescent light, compared with glass producing little auto-fluorescent light which is used in an ordinary fluorescence microscope.

In particular, for the fluorescence observation in which the GFP pigment is used, the wavelength of the auto-fluorescent light produced by each of the optical members is not very different from that produced by the GFP pigment. Hence, it is difficult to separate the fluorescent light produced by the GFP pigment from the auto-fluorescent light by the dichroic mirror and the absorption filter which are arranged in each observation optical path. Consequently, the auto-fluorescent light is superposed as a background on the fluorescent light of the specimen, and the problem arises that the contrast of the specimen is considerably deteriorated.

In the stereomicroscope, a numerical aperture in a combination of a 1× objective lens with the zoom lenses is as low as about 0.1 at a magnification of 10×, and a fluorescent image to be observed is very dark compared with the case where the numerical aperture in the fluorescence microscope is about 0.4 at almost the same magnification. In this way, the S/N ratio is highly limited, and a fluorescent image with a good contrast cannot be obtained.

The stereomicroscope which allows the fluorescence observation to be made has the problem that the observation images for the eyes are different in background brightness, due to the auto-fluorescent light from the stage glass and the optical member of the transmitting illumination system, caused by the excited light. This problem will be explained below with reference to FIG. 3.

In FIG. 3, excited light originating from the light source 21 is conducted to the zoom lens 2L of the observation optical path L for the left eye, of the two zoom lenses 2L and 2R. The excited light irradiates the specimen 7, and after being transmitted through the specimen 7, is also transmitted through the glass stage 8 to enter the transmitting illumination device C. In the transmitting illumination device C, auto-fluorescent light is emitted, due to the excited light, from the glass stage 8, the Fresnel lens 11, and the diffusion member 20. This auto-fluorescent light enters the objective lens 1 through the specimen 7. In this case, the zoom lens 2L of the observation optical path L for the left eye, in contrast with the zoom lens 2R of the observation optical path R for the right eye, is such that rays of the auto-fluorescent light are easy to enter.

Specifically, as shown in FIG. 3, the two observation axes 5L and 5R, after crossing at the specimen 7, is separated in the transmitting illumination device C. Here, since the excited light incident on the transmitting illumination device C travels along the observation optical axis 5L, the excited light with which the optical members such as the Fresnel lens 11 and the diffusion member 20 are irradiated is situated close to the observation optical axis 5L. Thus, the auto-fluorescent light is produced in the vicinity of the observation optical axis 5L, and most of the auto-fluorescent light is to be incident on the observation optical path L for the left eye with the observation optical axis 5L. As a result, the background of the observation optical path L for the left eye becomes bright. On the other hand, the observation optical axis 5R in the transmitting illumination device C is separated from the excited light, so that most of the auto-fluorescent light is not incident on the observation optical path R for the right eye. Consequently, the fluorescent image for the right eye is not affected by the auto-fluorescent light produced in the transmitting illumination device C, and the background darkens.

As mentioned above, since the conventional stereomicroscope for fluorescence observation is designed so that reflecting fluorescence illumination is provided from one of a pair of observation optical paths, the background of an observation image of the observation optical path where the reflecting fluorescence illumination is provided becomes bright, while the background of the other observation image becomes dark. It is, therefore, difficult for a viewer to integrally observe the left- and right-hand images, not to speak of a stereoscopic observation which is one of the features of the stereomicroscope. Thus, the problem arises that even in the case of a stereoscopic, simultaneous observation of the transmitted image due to the transmission illumination and the fluorescent image, it is very difficult to hold the entire image of the specimen.

Even with the use of a means for illuminating the specimen 8 with the excited light through the light guide, not through the zoom lens 2R or 2L, the same problem is raised.

In the case of a special frame for reflection illumination in which no optical system is provided below a specimen, it is common practice to use an opaque stage insert plate, in which, typically, one surface is white and the other is black. Where the stage insert plate is used for the reflecting fluorescence observation, a contrast is considerably deteriorated when the white side of the stage insert plate is placed below the specimen surface. Even when the black side is placed below the specimen, the auto-fluorescent light is emitted from the black stage insert plate, depending on the wavelength region of the excited light and kinds of resin material and paint of the stage insert plate, with a resulting deterioration in contrast.

In the discussion so far, reference has been made to the problems of auto-fluorescence in the stereomicroscope for fluorescence observation. However, even in the reflecting fluorescence observation of the conventional fluorescence microscope, the problems of the auto-fluorescence may be caused, as in the above description, by the optical members of the transmitting illumination device.

The conventional fluorescence microscope is designed so that, in the fluorescence observation, a light-blocking plate for intercepting excited light passing through a specimen is placed in a stage to thereby prevent the excited light from entering a condenser lens. With such an arrangement, however, the light-blocking plate must be removed from the illumination optical path each time the transmitting observation is carried out separately from the reflecting fluorescence observation, and thus working efficiency will be impaired. Moreover, even in a simultaneous observation for reflection fluorescence and transmission differential interference, the light-blocking plate must be removed from the illumination optical path. Consequently, the excited light caused by the reflection fluorescence passes through the specimen and enters the condenser lens, and the background of an observation image is rendered bright by auto-fluorescent light from the condenser lens, with a resulting deterioration in contrast. In order to suppress the emission of the auto-fluorescent light from the condenser lens, if the condenser lens is constructed of glass material in which little auto-fluorescent light is produced, the design of a condenser lens with high numerical aperture becomes difficult, and the degradation of aberration performance or an increase of the number of lenses will be caused, resulting in higher cost.

With the arrangement disclosed in Hei 9-292572, the brightness of the fluorescent image is increased nearly twice, but the intensity of auto-fluorescent light emitted from an objective lens is also increased nearly twice because the excited light reenters the objective lens. This constitutes an obstacle to the improvement of the S/N ratio and therefore the improvement of the contrast.

In Hei 9-292570, a technique of improving the contrast is disclosed. With this technique, however, auto-fluorescent light emitted from the illumination optical system and the objective lens can be cut off, but a sufficient space for placing the short-wavelength cutoff filter is not provided when the objective lens is short in working distance. Thus, in the case where the short-wavelength cutoff filter is constructed of colored glass, if the thickness of the filter is made small, the excited light cannot be completely cut off, while if it is larger, the aberration performance of the objective lens will be degraded. Furthermore, the contrast will be deteriorated by auto-fluorescent light from the colored glass filter. With the above technique, it is difficult to obtain a sufficient contrast. In addition, the use of the technique, which refers to transmitting fluorescence illumination, is not common practice.

SUMMARY OF THE INVENTION

It is, therefore, an object of the present invention to provide a microscope having a reflecting fluorescence illumination optical system in which auto-fluorescent light emitted from a glass stage and a condenser lens and optical members in a transmitting illumination system which are arranged below a specimen is widely cut off to make a reflecting fluorescence observation with a good contrast.

In order to achieve this object, according to one aspect of the present invention, the microscope having the reflecting fluorescence illumination optical system is equipped with an observation optical system and a specimen supporting means for mounting a specimen. In this case, an optical member for attenuating excited light supplied from the reflecting fluorescence illumination optical system is interposed between the specimen and the specimen supporting means.

According to another aspect of the present invention, the microscope having the reflecting fluorescence illumination optical system is equipped with a transmitting illumination optical system, an observation optical system, and a specimen supporting means for mounting a specimen. In this case, an optical member for attenuating excited light supplied from the reflecting fluorescence illumination optical system is interposed between the specimen and the transmitting illumination optical system.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
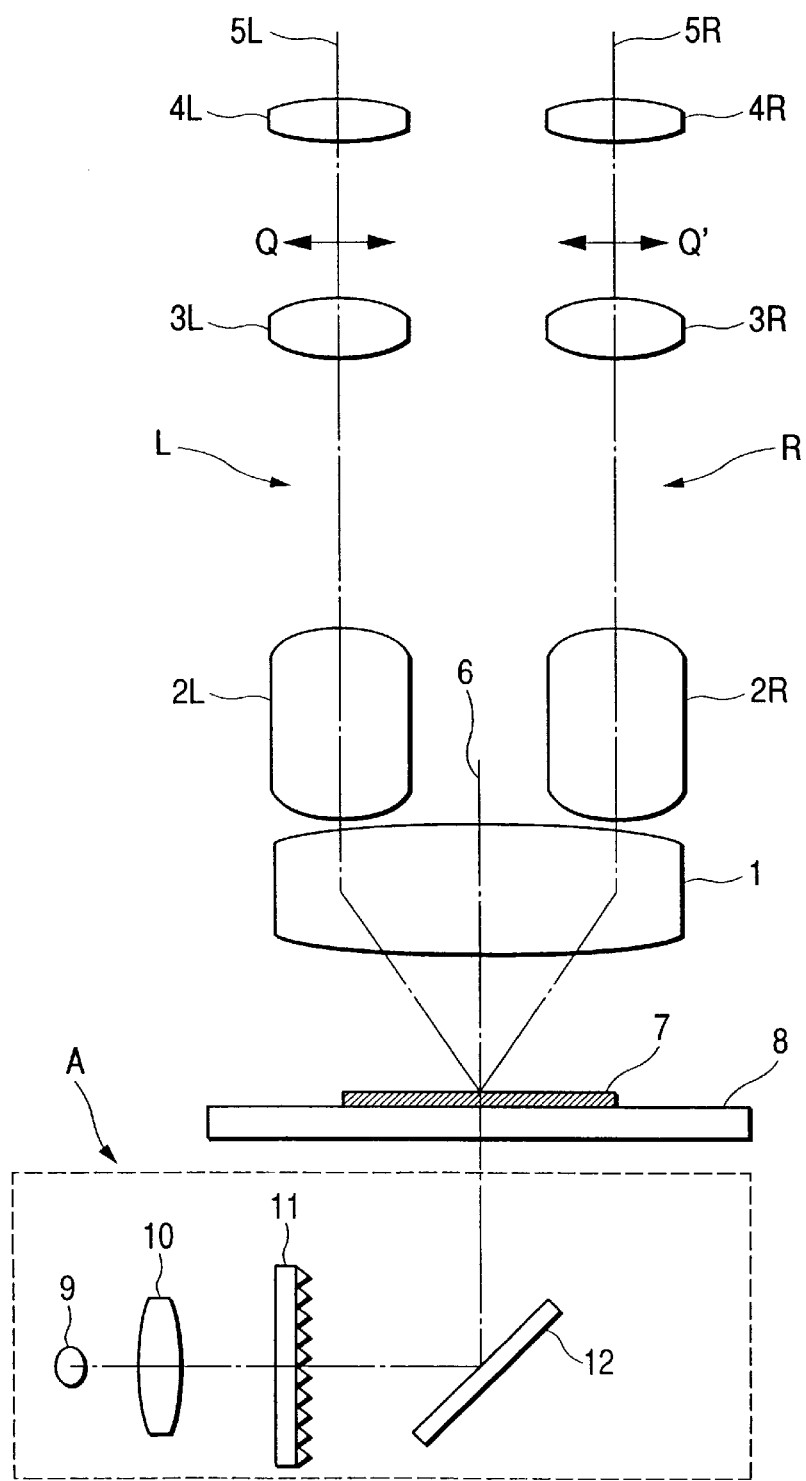
FIG. 1 is a view showing a conventional stereomicroscope equipped with a transmitting illumination device.
Figure 2:
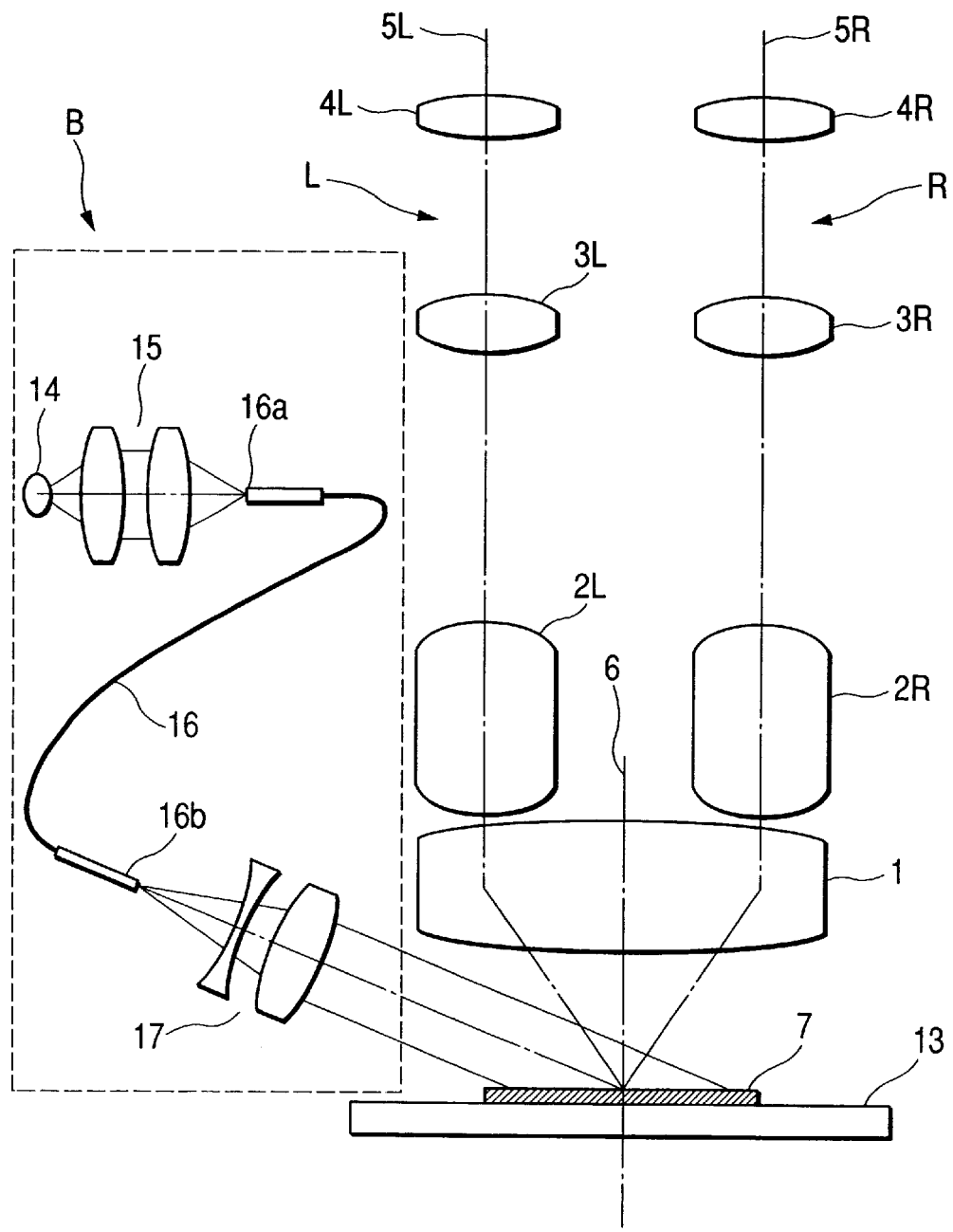
FIG. 2 is a view showing a conventional stereomicroscope equipped with a reflecting illumination device.

Before undertaking the explanation of the embodiments, it will be expedient to describe the aspects and functions of the present invention. According to one aspect of the present invention, in order to achieve the above object, the microscope having the reflecting fluorescence illumination optical system is constructed so that an optical element for attenuating excited light in which little auto-fluorescent light is produced, for example, an ND (neutral density) filter, is interposed between the specimen and the specimen supporting means. Here, the ND filter is such that the intensity of light to be transmitted is decreased at a nearly constant rate over a wide wavelength range.

In the fluorescence observation of the stereomicroscope in which the transmitting illumination observation is not made, a special frame for reflection illumination is used as a supporting member for mounting the specimen, and usually, a stage insert plate for mounting the specimen is made of resin and is an opaque member in white or black. In the use of such a frame, the ND filter or an interference filter is interposed between the opaque stage insert plate and the specimen.

With the above arrangement, excited light for reflecting fluorescence illumination is transmitted through the specimen and reaches the ND filter. The excited light, when transmitted through the ND filter, is attenuated in proportion to the absorption ratio of the ND filter and reaches the opaque stage insert plate. Auto-fluorescent light emitted from the stage insert plate, when also transmitted through the ND filter, is attenuated in proportion to the absorption ratio of the ND filter. In this way, the ND filter is interposed between the specimen and the stage insert plate, and thereby the intensity of the auto-fluorescent light from the stage insert plate is reduced by a factor of roughly a square of the absorption ratio of the ND filter. Hence, the background of the observation image darkens and the fluorescent image becomes sharp, so that observation can be made with a good contrast.

Even when the interference filter reflecting and cutting off the excited light, in which little auto-fluorescent light is produced, is placed instead of the ND filter, the same effect can be secured. In this case, if the interference filter is placed to be perpendicular to the optical axis, there is the possibility that part of the excited light reflected is incident on the objective lens and the auto-fluorescent light, although slight in amount, emits from the objective lens and the condenser lens. It is thus desirable that the interference filter, when used, is obliquely placed so that the reflected, excited light misses the objective lens. By doing so, it is avoidable that the contrast is deteriorated by the auto-fluorescent light from the optical members of the observation optical system. In the ND filter, the amount of excited light reflected by its surface is small compared with the case of the interference filter, and hence there is little problem even though the filter is not inclined. However, it may be inclined.

In the reflecting fluorescence observation under the stereomicroscope having the transmitting illumination device, an optical element for attenuating the excited light in which little auto-fluorescent light is produced is interposed between the specimen and the glass stage which is the supporting member for mounting the specimen. In the reflecting fluorescence illumination device where such an arrangement is made, fluorescent light emitted from the specimen, due to the excited light, is not entirely different from the case of the fluorescence observation of the conventional stereomicroscope. However, the excited light transmitted through the specimen is attenuated by the ND filter and reaches the glass stage.

The intensity of the excited light reaching the glass stage where the ND filter is placed, in contrast with the case where the ND filter is absent, is decreased in proportion to the absorption ratio of the ND filter. Hence, the auto-fluorescent light emitted from the glass stage also merely has the intensity decreased in the same manner. Moreover, since this auto-fluorescent light is also transmitted through the ND filter before entering the observation optical paths, its intensity is further decreased in proportion to the absorption ratio of the ND filter. Consequently, in the case where the ND filter is placed, the intensity of the auto-fluorescent light emitted from the glass stage, in contrast with the case where the ND filter is absent, is decreased by a factor of roughly a square of the absorption ratio of the ND filter.

Similarly, in the transmitting illumination device placed below the glass stage, the excited light attenuated by the ND filter reaches the optical members such as the lens and the diffusion member in the transmitting illumination device, and the auto-fluorescent light emitted therefrom is also transmitted through the ND filter. Hence, the intensity of this auto-fluorescent light is also decreased by a factor of roughly a square of the absorption ratio of the ND filter.

As mentioned above, by placing the ND filter below the specimen, the intensity of the auto-fluorescent light becomes very low compared with that of the fluorescent light from the specimen. As such, since the background of the specimen to the fluorescent image is very dark, the fluorescent image much improves in contrast and can be clearly observed. Even when the interference filter is used instead of the ND filter, the same effect can be brought about.

Thus, by placing the ND filter or the interference filter, not only is the fluorescence observation with a high contrast carried out, but also a transmitting oblique illumination or dark-field illumination observation which provides a transparent specimen with a contrast and the fluorescence observation can be made simultaneously. In other words, when it is necessary to observe stereoscopically a specimen in which colorless, transparent cells are provided with the pigment of GFP, the reflecting fluorescence observation and the transmitting oblique illumination or dark-field illumination observation under the stereomicroscope become possible. Furthermore, by virtue of the function of the ND filter, the emission of the auto-fluorescent light from the glass stage and the optical members of the transmitting illumination device is completely suppressed, so that observation can be made with a high contrast.

The auto-fluorescent light incident on the objective lens is considerably attenuated by the ND filter or the interference filter. Thus, a difference in auto-fluorescence between the left- and right-hand observation optical paths is almost invisible to a viewer. This enables the viewer to make a stereoscopic fluorescence observation of the specimen as well as a simultaneous observation combining transmission illumination and oblique illumination. The intensity of transmitting illumination light in the simultaneous observation is satisfactory if it has brightness corresponding to that of the fluorescent light emitted from the specimen, and thus sufficient brightness can be obtained even when the ND filter is placed.

According to another aspect of the present invention, in the reflecting fluorescence microscope, the ND filter is interposed, instead of the light-blocking plate which has been used, between the specimen and the condenser lens in the transmitting illumination device.

Due to the placement of the ND filter, when the excited light for the reflecting fluorescence observation passes through the specimen and is transmitted through the ND filter, the intensity of the excited light is decreased in proportion to the absorption ratio of the ND filter and the excited light is incident on the condenser lens. When the auto-fluorescent light emitted, due to the excited light, from the condenser lens and the optical members in the transmitting illumination device is incident on the objective lens, it also passes through the ND filter and thus is attenuated in proportion to the absorption ratio of the ND filter. Hence, when the ND filter is placed below the specimen, the intensity of the auto-fluorescent light is decreased by a factor of the square of the absorption ratio of the ND filter, and the background of the fluorescent image becomes dark, with a resulting increase in contrast.

In the following, a description will be given of the embodiments of the present invention.

First Embodiment

Figure 3:
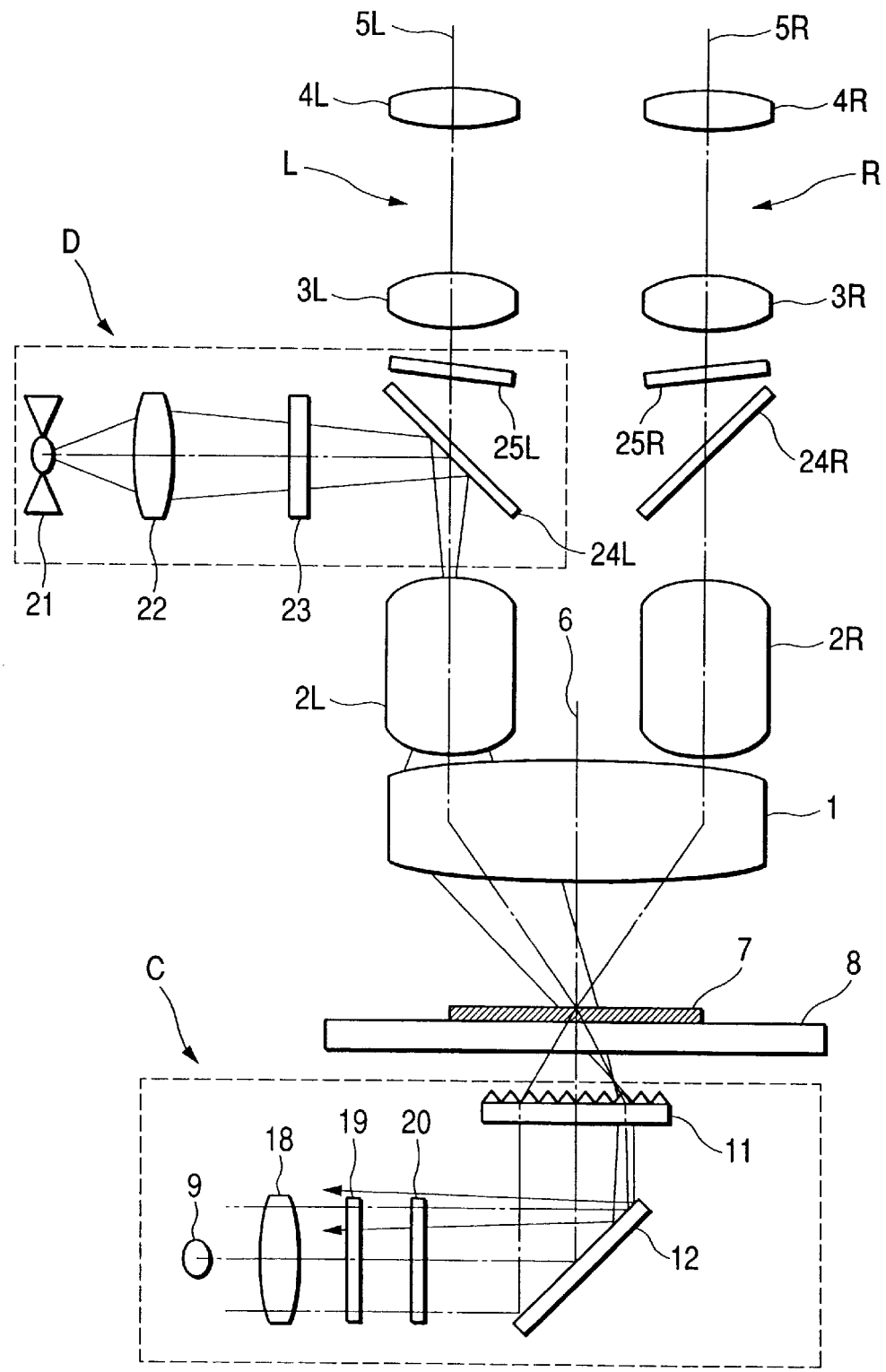
FIG. 3 is a view showing a conventional stereomicroscope equipped with a reflecting fluorescence illumination device and a transmitting illumination device.
Figure 4:
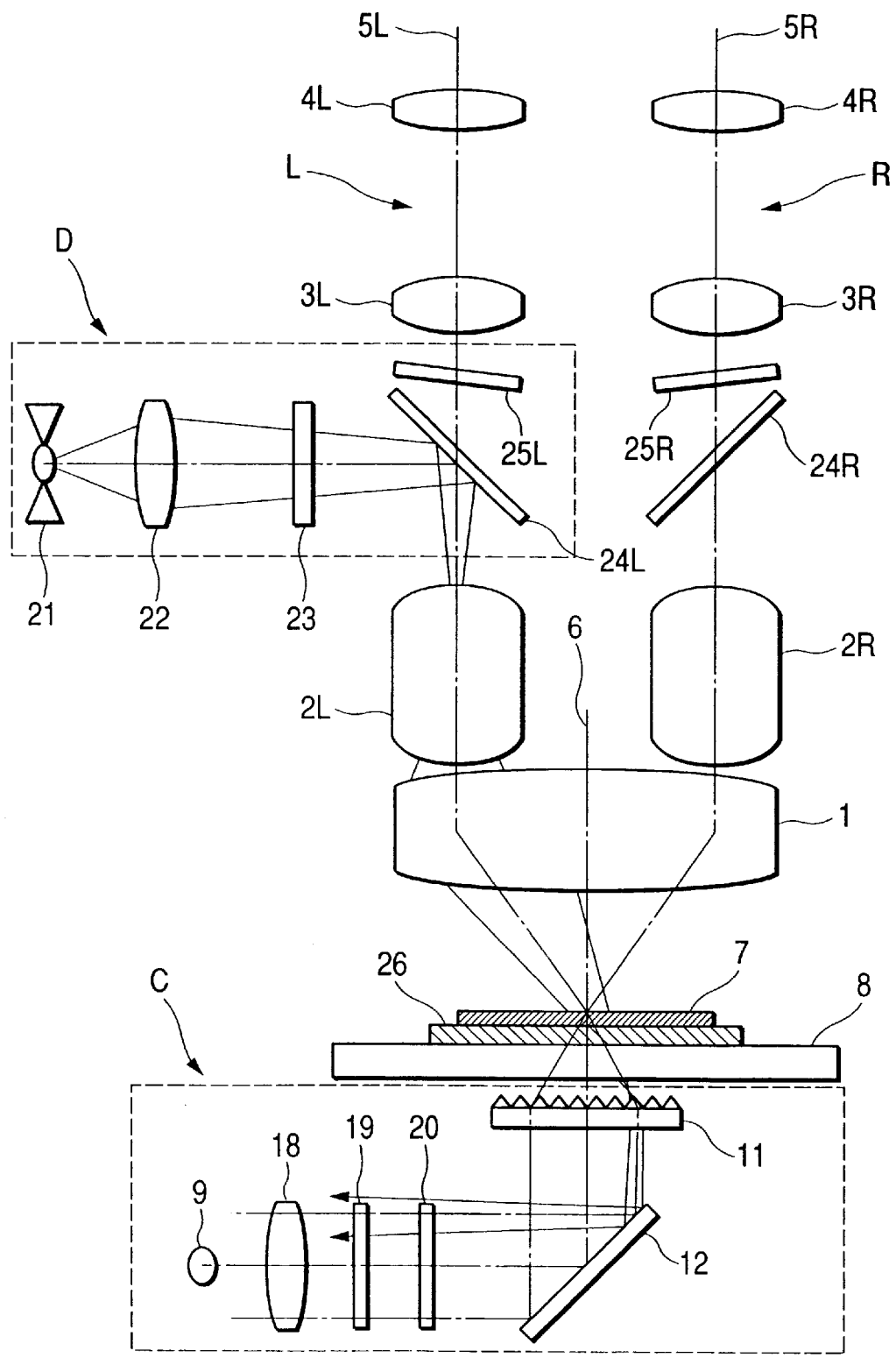
FIG. 4 is a view showing a stereomicroscope of a first embodiment of the present invention in which the reflecting fluorescence illumination device and the transmitting illumination device are provided and an optical member for attenuating auto-fluorescent light is placed below a specimen.

FIG. 4 shows the first embodiment of the present invention. In this figure, like numerals are used for like components with respect to FIG. 3 and a detailed explanation on the components is omitted. This embodiment is such that, in a stereomicroscope equipped with the transmitting illumination device C and the reflecting fluorescence illumination device D, an ND filter 26 is interposed between the specimen 7 and the glass stage 8.

Excited light emitted from the light source 21, after passing through the illumination lens 22 and the excitation filter 23 and being reflected by the dichroic mirror 24L disposed in the observation optical path L for the left eye, travels through the zoom lens 2L and the objective lens 1 and irradiates the specimen 7.

Fluorescent light is emitted from the specimen 7 irradiated with the excited light, while part of the excited light is transmitted through the specimen 7. Since in the first embodiment the ND filter 26 is placed immediately below the specimen 7, the intensity of the excited light is decreased in proportion to the absorption ratio of the ND filter 26, and the excited light reaches the glass stage 8. Although auto-fluorescent light is emitted from the glass stage 8, the excited light is attenuated by the ND filter and thus the intensity of the auto-fluorescent light is reduced to a minimum. Moreover, since the auto-fluorescent light emitted from the glass stage is also transmitted through the ND filter 26, it is attenuated by the absorption ratio of the ND filter 26.

In this way, the auto-fluorescent light emitted from the glass stage where the ND filter is placed, in contrast with the case where the ND filter is not placed, is attenuated by a factor of roughly a square of the absorption ratio of the ND filter. In the stereomicroscope of the present invention in which the fluorescence observation can be made, the amount of emission of the auto-fluorescent light superposed on the fluorescent image can be completely reduced by the ND filter, and as such the background of the image becomes quite dark. Hence, the contrast of the image is considerably improved and a sharp fluorescent image can be observed.

Likewise, in the transmitting illumination device C placed below the specimen 7, the excited light attenuated by the ND filter 26 reaches the Fresnel lens 11 and the diffusion member 20, and thus the auto-fluorescent light emitted therefrom is very faint. Since the auto-fluorescent light, when entering the observation paths, is also transmitted through the ND filter, the intensity of the auto-fluorescent light emitted from the optical members such as the Fresnel lens 11 and the diffusion member 20 is also decreased by a factor of roughly a square of the absorption ratio of the ND filter. This makes the background dark and the fluorescent image sharp, and enables the fluorescence observation to be made with a good contrast.

Figure 5:
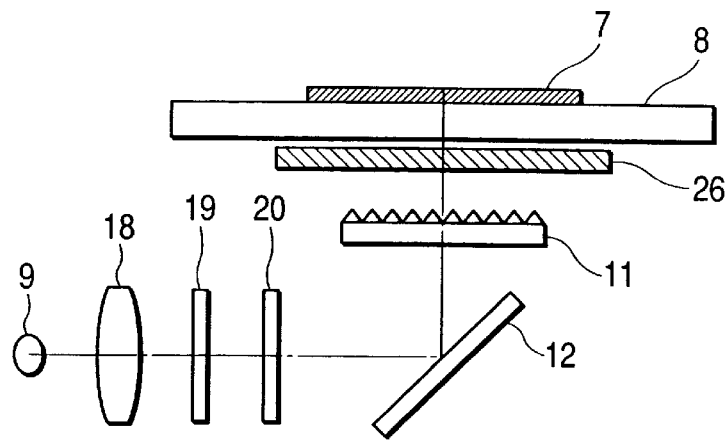
FIG. 5 is a view showing another example of the placement of the optical member for attenuating the auto-fluorescent light in the first embodiment.

FIG. 5 shows another example of the placement of the ND filter 26. As shown in this figure, the ND filter 26 is placed on the Fresnel lens side of the glass stage 8 and thereby the auto-fluorescent light emitted from the transmitting illumination device C can be cut off. In this case, it is desirable to use a glass material in which little auto-fluorescent light is produced, as the glass stage 8.

Alternatively, the stage glass 8 may be constructed with an optical element possessing a spectral property of decreasing the intensity of the excited light, or the surface of the glass stage 8 may be coated with an interference film possessing the spectral property of decreasing the intensity of the excited light.

Figure 6A:
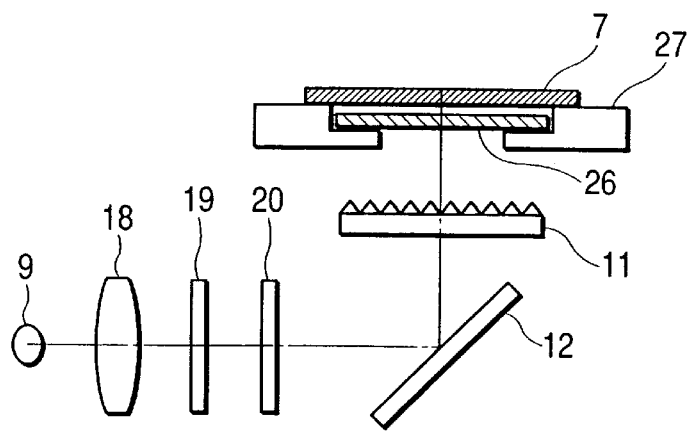
FIGS. 6A and 6B are views showing other examples of the placement of the optical member in the first embodiment.

For still another example of the placement of an optical member for decreasing the intensity of the excited light and attenuating the auto-fluorescent light emitted from the optical members in the transmitting illumination device C, it is conceivable that, as shown in FIG. 6A, a stage insert plate 27 with a stepped hole smaller in size than the specimen 7 is used, instead of the glass stage 8, to place the ND filter 26 in the stage insert plate 27, or the ND filter 26 is interposed between the stage insert plate 27 and the Fresnel lens 11 (which is not shown).

Figure 6B:
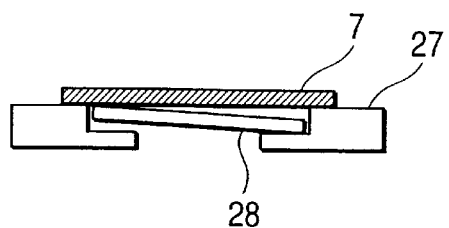

Alternatively, as shown in FIG. 6B, a filter which has the spectral property different from that of the ND filter and produces little auto-fluorescent light can be used in place of the ND filter 26. For such a filter, it is conceivable to use an interference filter such as a narrow-band absorption filter having the property of absorbing only the wavelengths of the excited light or a narrow-band reflection filter having the property of reflecting only the wavelengths of the excited light.

Consequently, even when an interference filter 28 having the above spectral property is placed, the same function and effect as in the ND filter is brought about. However, the excited light reflected by the interference filter 28 is incident on the objective lens 1, and the auto-fluorescent light, although slight in amount, is sometimes emitted from the objective lens 1 and the zoom lenses 2R and 2L. It is, therefore, necessary to avoid the deterioration of the contrast caused by the auto-fluorescent light in such a way that the interference filter 28 is placed, for example, to incline with respect to the optical axis 6 or the stage insert plate 27.

Figure 7A:
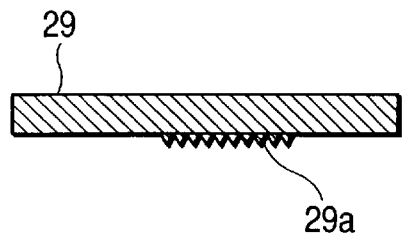
FIGS. 7A, 7B, and 7C are views showing structures of optical members for attenuating the auto-fluorescent light.
Figure 7B:
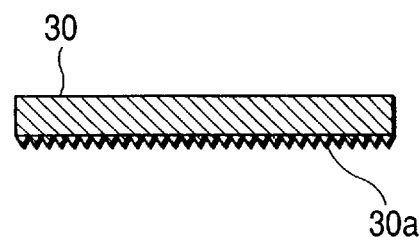

FIGS. 7A and 7B illustrate the modification examples of the ND filter. An ND filter 29 shown in FIG. 7A provides a part of one side thereof with a diffusion region 29a. This diffusion part is provided to match the area of the excited light illuminating the specimen 7. In doing so, the excited light transmitted through the specimen 7, when passing through the ND filter 29, is diffused by the diffusion region 29a. In this way, since it is avoidable that the excited light is incident on only the particular parts of the Fresnel lens 11 and the diffusion member 20, the emission of the auto-fluorescent light from these optical members is uniformized so that the light is almost evenly incident on the left- and right-hand observation optical paths. When the filter 29 is used as mentioned above, the left- and right-hand fluorescent images become nearly uniform in brightness and background, and thus a stereoscopic view can be facilitated.

Figure 7C:
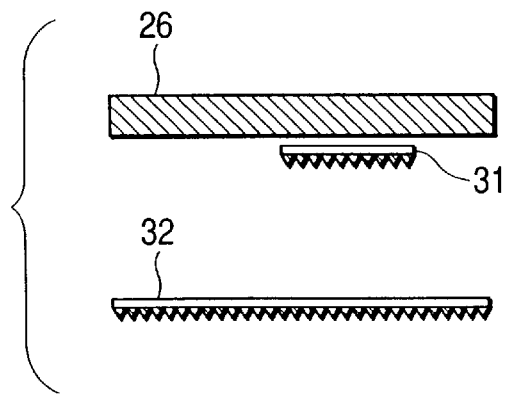

An ND filter 30 shown in FIG. 7B is such that a diffusion region 30a extends over its entire area. When the specimen 7 is mounted directly on the filter as shown in FIG. 4, it can be held in a state of stabler equilibrium than in FIG. 7A. In FIG. 7C, diffusion members 31 and 32 are provided to be independent of the ND filter 26. In this case, since the diffusion members can be fabricated separately from the ND filter, the size and diffusion condition of the diffusion region can be arbitrarily chosen. The diffusion members 31 and 32, after fabrication, can be adhered to the ND filters as shown in FIGS. 7A and 7B, respectively. If the diffusion members are incorporated in a turret, the diffusion members having various properties can be used in accordance with specimens without replacing the ND filter.

It is only necessary that the surface roughness of each of the diffusion regions 29a and 30a and the diffusion members 31 and 32 is properly determined in accordance with an observation condition. However, when the fluorescence observation and the transmission observation are carried out, it is necessary to minimize the surface roughness so that it is avoidable that transmitting illumination light is diffused by the diffusion region and the diffusion member to cause obstruction to the illumination of the specimen 7.

As mentioned above, in the first embodiment of the present invention, the optical member which decreases the intensity of the excited light transmitted through the specimen is placed below the specimen, and thereby the observation images for the left and right eyes improve in contrast, irrespective of the existence of the transmitting illumination device. Furthermore, since the observation images are dark in background and have nearly equivalent brightness, a stereoscopic fluorescence observation and a simultaneous fluorescence observation due to transmission illumination become quite possible.

Where the fluorescent images are required to further improve in brightness, it is possible that the dichroic mirror 24R in the observation optical path R for the right eye is utilized and the same illumination device as the reflecting fluorescence illumination device D is placed in the observation optical path R for the right eye to make a reflecting fluorescence illumination observation. By doing so, the brightness of each fluorescent image increases about twice and the background of the observation image becomes sufficiently dark, with the result that observation can be made with a good contrast.

Second Embodiment

Figure 8:
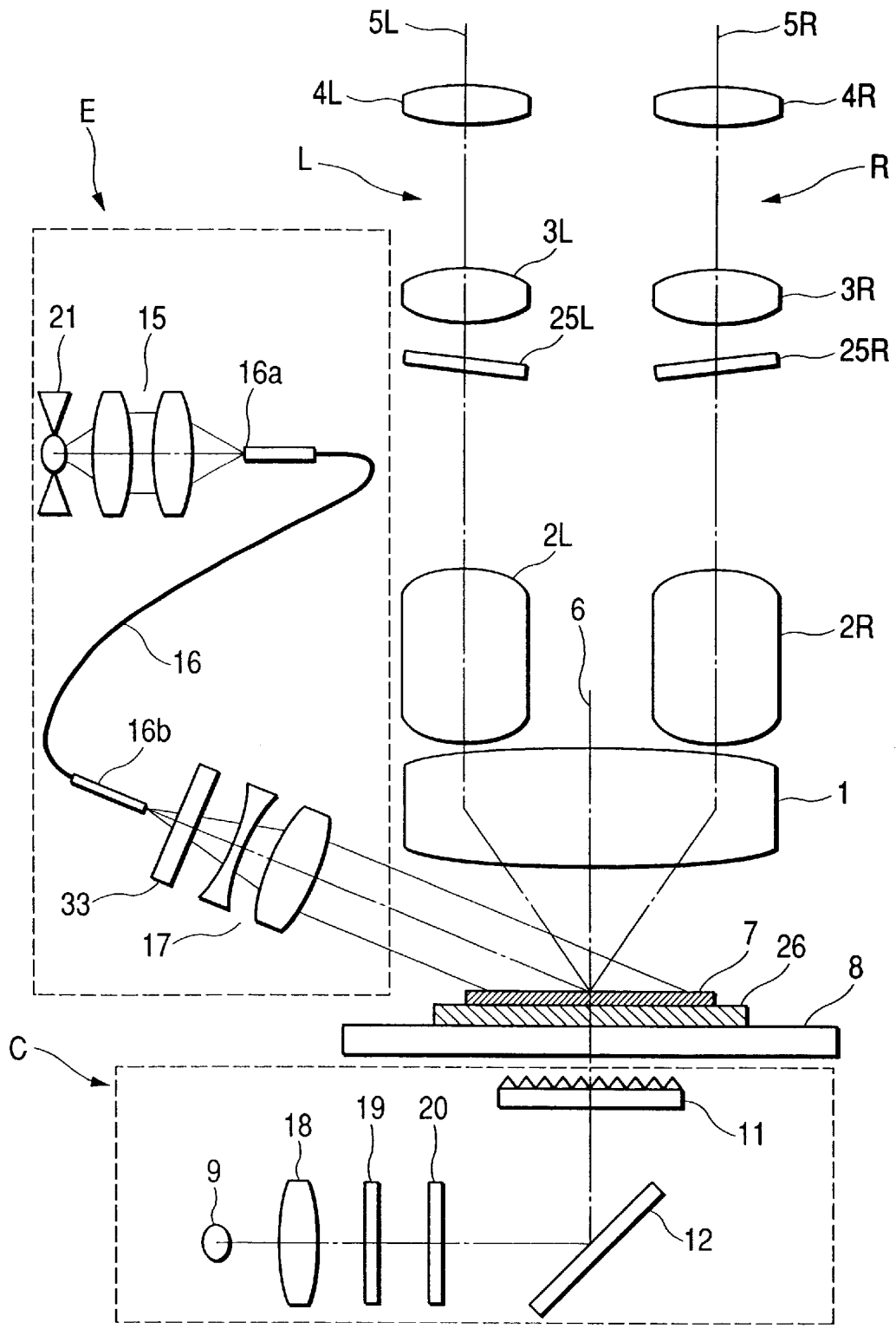
FIG. 8 is a view showing a stereomicroscope of a second embodiment of the present invention in which the reflecting fluorescence illumination device and the transmitting illumination device are provided and the optical member for attenuating the auto-fluorescent light is placed below the specimen.

FIG. 8 shows the second embodiment of the present invention. This embodiment is designed so that, in a stereomicroscope equipped with the transmitting illumination device C and a reflecting fluorescence illumination device E, the ND filter 26 is interposed between the specimen 7 and the glass stage 8.

The optical system of the reflecting fluorescence illumination device E is constructed with the light source 21, the collector lens 15, the light guide fiber 16, an excitation filter 33, and the illumination lens 17 whose illumination range is variable. Excited light emitted from the light source 21 is collected by the collector lens 15 and is introduced into the entrance end face 16a of the light guide fiber 16. The excited light emerging from the exit end face 16b of the light guide fiber 16 is such that only light of a particular wavelength region is selected by the excitation filter 33 and passes through the illumination lens 17 to irradiate the specimen 7. Fluorescent light emanating from the specimen 7, as in the first embodiment, passes through the objective lens 1, the zoom lenses 2R and 2L, the absorption filters 25R and 25L, and imaging lenses 3R and 3L, and is observed through the eyepieces 4R and 4L.

In the second embodiment also, the excited light transmitted through the specimen 7 is transmitted through the glass stage 8 and enters the transmitting illumination device C. Since the ND filter 26, as in the first embodiment, is placed immediately below the specimen 7, the excited light, when transmitted through the ND filter 26, is attenuated in proportion to the absorption ratio of the ND filter 26, and reaches the glass stage 8. However, the auto-fluorescent light emitted, due to the excited light, from the stage glass 8 and the optical members in the transmitting illumination device C is also transmitted through the ND filter 26 when entering the right- and left-hand observation optical paths R and L, and thus the auto-fluorescent light is attenuated by the absorption ratio of the ND filter 26. In this way, the intensity of the auto-fluorescent light is deceased by a factor of roughly a square of the absorption ratio of the ND filter 26. Consequently, since the background is dark and the fluorescent image becomes sharp, the contrast of the image is materially improved.

As mentioned above, even where the observation optical path of the stereomicroscope is not used for reflecting fluorescence illumination, the ND filter or the interference filter described in the first embodiment is placed below the specimen 7, thereby improving the contrast. Furthermore, the placement of this optical member causes the intensity of the excited light transmitted through the specimen to be decreased, no matter whether the optical system of the transmitting illumination device is present or not, or even though any transmitting illumination device is placed. Hence, the fluorescence observation, in which the auto-fluorescent light produced below the specimen is faded, can be made with a good contrast.

Moreover, since the excited light does not travel through the zoom lens 2R or 2L, the auto-fluorescent light is not produced from the observation paths and the emission of the auto-fluorescent light from the transmitting illumination device can be considerably suppressed. As a result, the backgrounds of the observation images for the right and left eyes become quite dark and equal, and the stereoscopic simultaneous observation combining transmission illumination, as well as the reflecting fluorescence observation, can be carried out.

Third Embodiment

Figure 9:
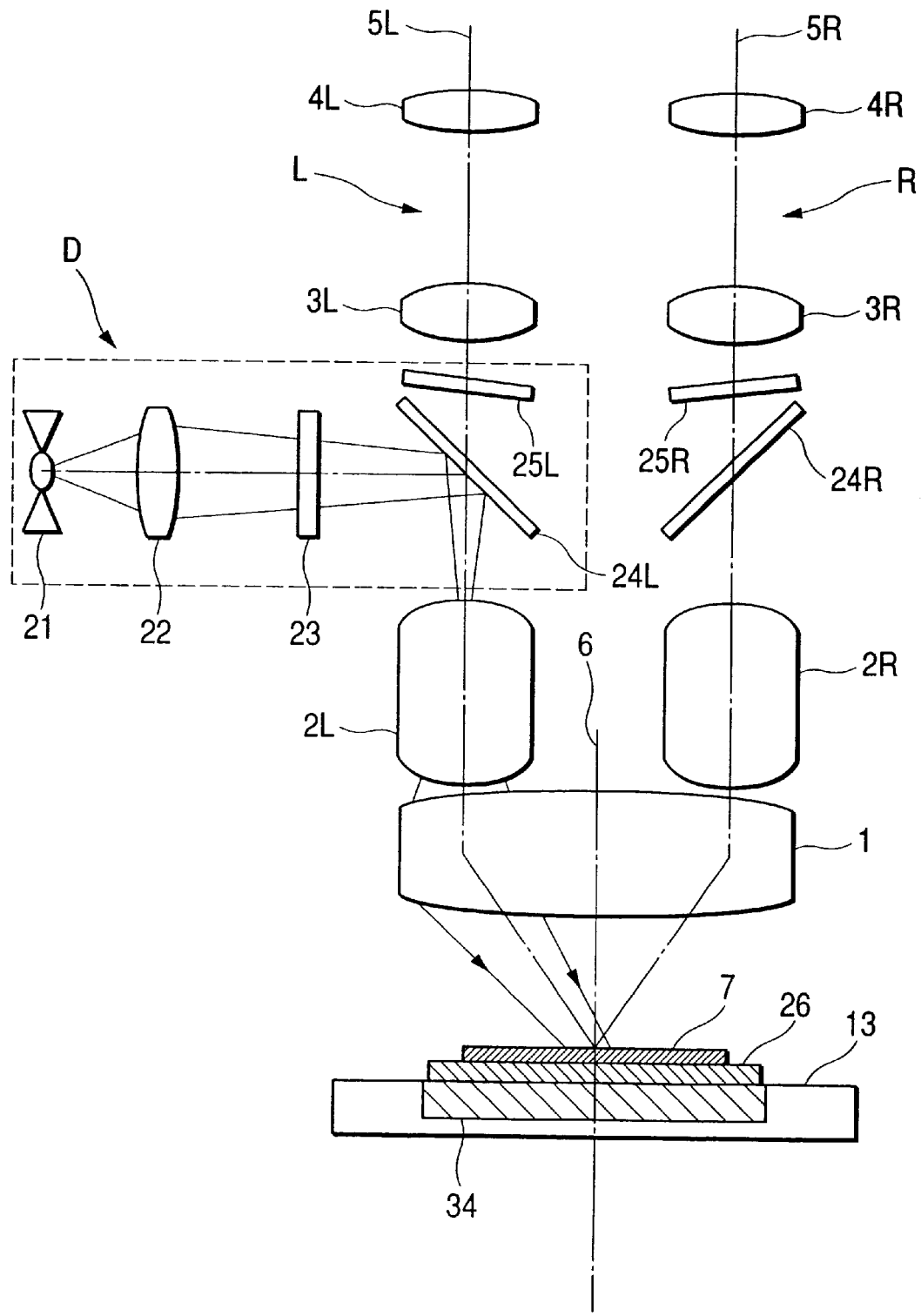
FIG. 9 is a view showing a stereomicroscope of a third embodiment of the present invention in which only the reflecting fluorescence illumination device is provided and the optical member for attenuating the auto-fluorescent light is placed below the specimen.

FIG. 9 shows the third embodiment of the present invention. This embodiment is designed so that, in a stereomicroscope exclusively used for reflection fluorescence which does not have the transmitting illumination device, the ND filter 26 is interposed between the specimen 7 and the stage 13.

Excited light transmitted through the specimen 7, as described in the first embodiment, reaches the ND filter 26. Here, when the excited light is transmitted through the ND filter 26, the intensity of the excited light is attenuated in proportion to the absorption ratio of the ND filter 26. Due to the excited light arriving at a stage insert plate 34, auto-fluorescent light is emitted from the stage insert plate 34, but it is very faint because the excited light is attenuated by the ND filter 26. Additionally, since the auto-fluorescent light emitted from the stage insert plate 34, when entering the observation optical paths, is also transmitted through the ND filter 26, the intensity of the auto-fluorescent light is decreased by a factor of roughly a square of the absorption ratio of the ND filter 26. Thus, the background is dark and the fluorescent image becomes sharp, with the result that the fluorescence observation can be made with a good contrast. Here, even when the interference filter 28 for attenuating the excited light in which little auto-fluorescent light is produced, as in the first embodiment, is placed instead of the ND filter 26, the same effect is secured.

Figure 10:
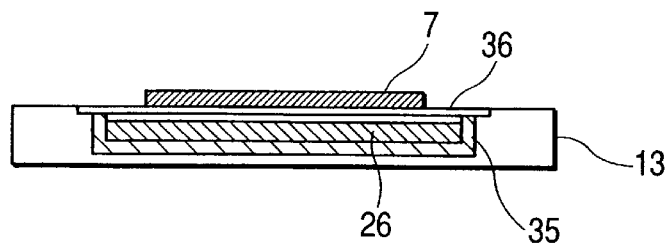
FIG. 10 is a view showing another example of the placement of the optical member for attenuating the auto-fluorescent light in the third embodiment.

As shown in FIG. 10, even when a stage insert plate 35 is designed so that the ND filter 26 or the interference filter for attenuating the excited light is placed therein, the same effect is obtained. A plane-parallel plate 36 which is small in thickness and produces little auto-fluorescent light, combining the protection of the surface of the ND filter 26 with the support of the specimen 7, may be interposed between the specimen 7 and the filter 26.

Even when the reflecting fluorescence illumination device E shown in FIG. 8 is used, the auto-fluorescent light emitted from the stage insert plate 34 can be attenuated by the ND filter 26. Hence, the background is dark and the fluorescent image becomes sharp, so that the fluorescence observation which is favorable in contrast is possible.

Figure 11A:
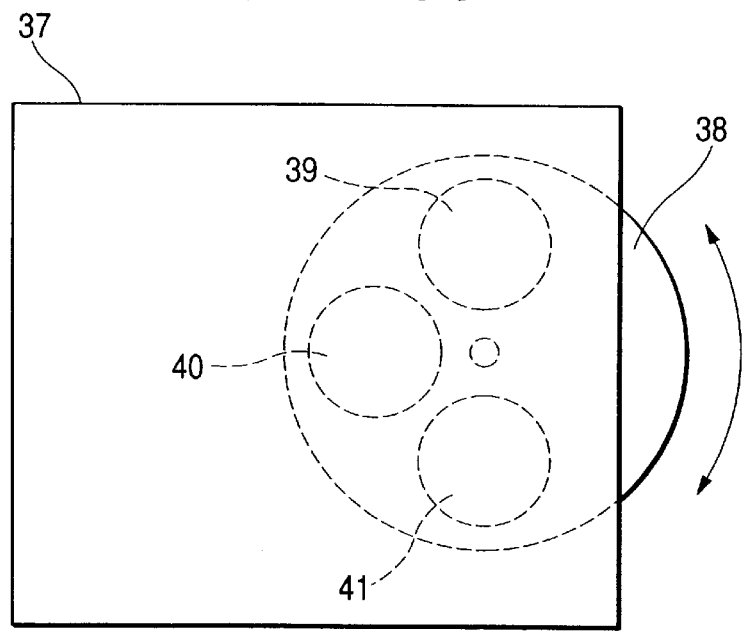
FIGS. 11A and 11B are a plan view and a cross sectional view, respectively, showing still another example of the placement of the optical member in the third embodiment.
Figure 11B:
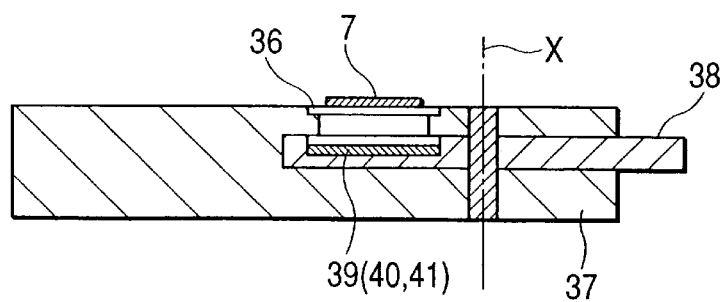

FIGS. 11A and 11B show a modification example of the placement of the ND filter. In these figures, a space is provided inside a stage 37 so that a turret 38 is inserted therein. The turret 38 is provided with a plurality of holes so that ND filters 39, 40, and 41 can be arranged. The turret 38 is also designed to turn about an axis of rotation X, and one of the ND filters 39, 40, and 41 is positioned below the specimen 7 by the rotation of the turret 38. A part of the turret 38 protrudes from the stage 37, and by moving this part in the direction of an arrow, the turret 38 is rotated.

In this modification example, since a plurality of ND filters 39, 40, and 41 are provided, an ND filter with an optimum absorption ratio can be chosen in view of an intensity ratio between the fluorescent light emitted from the specimen 7 and the auto-fluorescent light and an intensity ratio with transmitting illumination light. In this way, observations which are good in contrast are made in accordance with various observations, such as only the fluorescence observation and a combination of the fluorescence observation with the transmission observation. The turret can be constructed with two stages so that the ND filters are arranged in the upper stage, while the diffusion members shown in FIGS. 7A, 7B, and 7C are arranged in the lower stage.

The filters arranged in the turret 38 need not necessarily be the ND filters, and may be interference filters or plane-parallel plates in which little auto-fluorescent light is produced, when necessary.

Thus, when the optical member for attenuating the excited light transmitted through the specimen is placed to movable in and out of the illumination optical path so that the absorption ratio of the optical member for attenuating the excited light can be selected, a fluorescent image with a high contrast is obtained. Furthermore, since the optical member can be removed from the transmitting illumination optical path and bright illumination light is obtained even in observation for transmission illumination only, work efficiency is improved. Also, it is needless to say that the structure shown in FIGS. 11A and 11B is not limited to the third embodiment, but is applicable to other embodiments.

Fourth Embodiment

Figure 12:
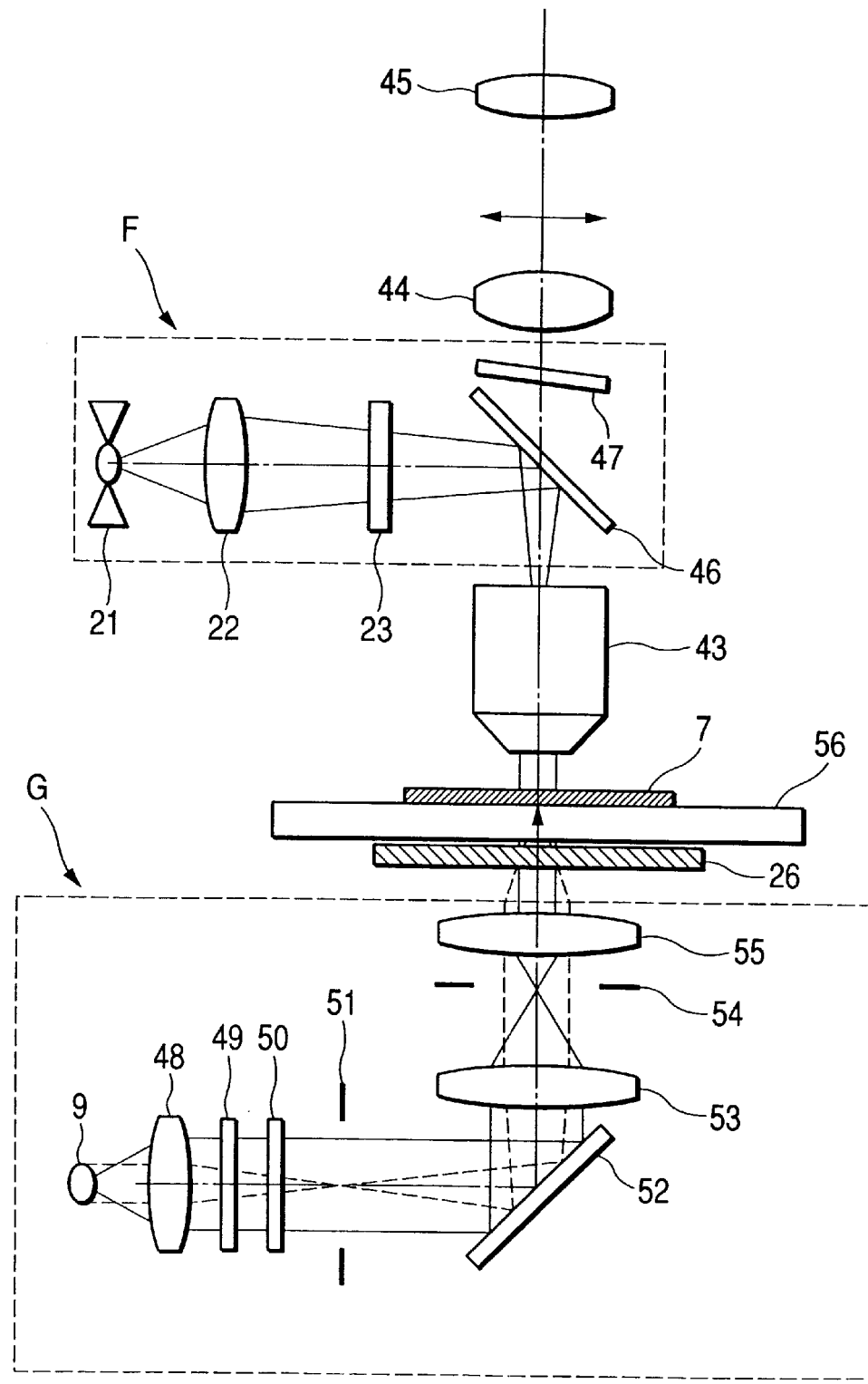
FIG. 12 is a view showing a stereomicroscope of a fourth embodiment of the present invention in which the reflecting fluorescence illumination device and the transmitting illumination device are provided and the optical member for attenuating the auto-fluorescent light is placed below the specimen.

The fourth embodiment of the present invention is shown in FIG. 12. This embodiment is such that, in a reflecting fluorescence microscope equipped with a reflecting fluorescence illumination device F and a transmitting illumination device G, the ND filter is interposed between the specimen and a condenser lens.

The microscope of the fourth embodiment has an objective lens 43, an imaging lens 44, and an eyepiece 45 which constitute the observation optical system. Light from the specimen 7 is changed to a parallel beam by the objective lens 43, and the image of the specimen 7 is formed by the imaging lens 44 so that this image is observed through the eyepiece 45.

The optical system of the reflecting fluorescence illumination device F includes the light source 21, the illumination lens 22, the excitation filter 23, a dichroic mirror 46, and an absorption filter 47. Excited light emitted from the light source 21 is introduced into the excitation filter 23 by the illumination lens 22. The excitation filter 23 selectively transmits only the excited light required for excitation of the specimen 7. The excited light transmitted through the excitation filter 23 is reflected by the dichroic mirror 46 and is introduced by the objective lens 43 to irradiate the specimen 7.

Fluorescent light emitted from the specimen 7 is collected by the objective lens 43, and after being transmitted through the dichroic mirror 46, is selected in accordance with the spectral property of the absorption filter 47. The fluorescent light transmitted through the absorption filter 47 is imaged by the imaging lens 44, and a resultant image is observed through the eyepiece 45.

The optical system of the transmitting illumination device G, on the other hand, is a typical Kohler illumination system, and includes the light source 9, a collector lens 48, a filter 49, a diffusion member 50, a field stop 51, a deflection mirror 52, a relay lens 53, an aperture stop 54, and a condenser lens 55.

In the transmitting illumination device G, illumination light emitted from the light source 9 is changed to a nearly parallel beam by the collector lens 48 and is deflected, through the filter 49 and the diffusion member 50, by the deflection mirror 52 so that the image of the light source 9 is formed at the position of the object focal point of the condenser lens 55 by the relay lens 53. A stop is placed at the position of the object focal point of the condenser lens 55 and functions as the aperture stop 54. At the position of the object focal point of the relay lens 53, a stop is disposed, and serves as the field stop 51.

In the fourth embodiment, the excited light from the reflecting fluorescence illumination device F, after passing through the specimen 7, is incident on the ND filter 26, where the intensity of the excited light is reduced by an amount equivalent to the absorption ratio of the ND filter. The excited light thus attenuated travels through the condenser lens 55 and the relay lens 53, and causes auto-fluorescent light to be emitted from these lenses. However, since such auto-fluorescent light is very faint and also passes through the ND filter 26 when returning to the objective lens 43, its intensity is reduced by the absorption ratio.

In view of the cases where the ND filter 26 is placed and not, the brightness of the background of the fluorescent image in the former case is reduced by a factor of roughly a square of the absorption ratio of the ND filter, and thus a fluorescent image with a high contrast can be observed.

In the arrangement mentioned above, transmitting illumination light is merely attenuated by the absorption ratio of the ND filter 26, and a sufficient amount of illumination light is ensured even in the case of only the transmitting illumination observation. If the condenser lens 55 is replaced with a condenser lens which allows observations, for example, on differential interference, phase difference, and Hoffman modulation contrast, to be made, the simultaneous observation with the fluorescence observation can be carried out, and an observation in which the emission of the auto-fluorescent light from the condenser lens is considerably suppressed can be made with a good contrast. When reflected light from the ND filter 26 is incident on the objective lens, it is only necessary to incline the ND filter.

Furthermore, if a stage 56 is designed to have the structure such as in FIGS. 11A and 11B, thereby rendering the ND filter movable in and out of the transmitting illumination optical path, it is possible to accommodate the case where bright transmitting illumination light such as in a polarization observation is required. Hence, the same illumination as in an ordinary polarization observation can be obtained. In accordance with the excitation band of the reflecting fluorescence observation, the optical member for attenuating the excited light transmitted through the specimen may be interposed between the specimen 7 and the condenser lens 55 to be movable in and out of the transmitting illumination optical path.

If an arrangement is made so that a colorless, transparent plane-parallel plate which has the same optical path length as the ND filter 26 can be switched with respect to the transmitting illumination optical path, a conjugate relationship between the field stop 51 and the specimen 7 will be compensated, and thereby the aperture stop 54 disposed at the position of the object focal point of the condenser lens 55 can be rendered always conjugate with the position of the image focal point of the objective lens 43. By doing so, the colorless, transparent plane-parallel plate is used for the observations of differential interference and phase difference, so that a conjugate relationship between the condenser lens and the pupil of the objective lens is compensated and the observations can be made with bright transmitting illumination light.

Figure 13:
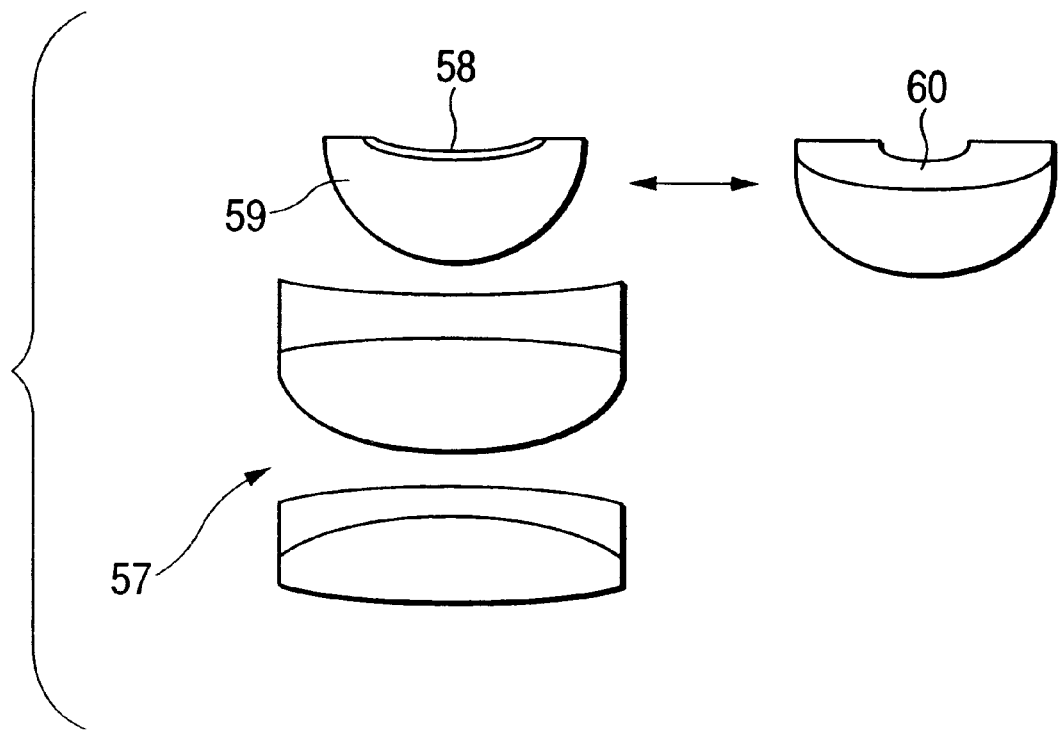
FIG. 13 is a view showing a condenser lens with an evaporated film for attenuating the auto-fluorescent light.

As shown in FIG. 13, when a condenser lens or an oil-immersion condenser lens in which its working distance diminishes is used, the first surface of a lens located on the specimen side of a condenser lens system 57 is coated with a film for attenuating the excited light for reflecting fluorescence illumination, for example, an evaporated film 58. In this way, the intensity of the excited light can be decreased, and the same function as in the above description can be performed. The evaporated film 58 may have a spectral property such as to agree with the wavelength region of the excited light or may have a property such as that of the ND filter.

Moreover, a lens unit 59 including the first surface of the lens, located closest to the specimen, of the condenser lens system 57 can be replaced with, or switched to, another lens unit 60. Here, the lens unit 60 may have an evaporated film different from that of the lens unit 59, or may be a coated lens used in an ordinary, optical microscope. In this configuration, an optimum condenser lens can be selected and used in accordance with the observation requiring bright transmitting illumination light and the excitation band of the reflecting fluorescence, mentioned above, and work efficiency is improved by switching an observation technique.

In various constructions mentioned above, the emission of the fluorescent light from below the specimen can be considerably suppressed by the optical member for attenuating the excited light transmitted through the specimen, to improve the contrast. However, it is needless to say that this does not depend on the arrangement of the lens and optical elements in the optical system of the transmitting illumination device.

What is claimed is:

1. A microscope having a reflecting fluorescence illumination optical system, equipped with an observation optical system and specimen supporting means for mounting a specimen, wherein an optical member for attenuating excited light supplied from said reflecting fluorescence illumination optical system is interposed between said specimen and said specimen supporting means.

2. A microscope having a reflecting fluorescence illumination optical system, equipped with a transmitting illumination optical system, an observation optical system, and a specimen supporting means for mounting a specimen, wherein an optical member for attenuating excited light supplied from said reflecting fluorescence illumination optical system is interposed between said specimen and said transmitting illumination optical system.

3. A microscope having a reflecting fluorescence illumination optical system according to claim 1, wherein said microscope is a stereomicroscope having a pair of right- and left-hand observation optical paths as said observation optical system.

4. A microscope having a reflecting fluorescence illumination optical system according to claim 2, wherein said microscope is a stereomicroscope having a pair of right- and left-hand observation optical paths as the observation optical system.

5. A microscope having a reflecting fluorescence illumination optical system according to claim 2 or 3, wherein said optical member is also used as a support of said specimen.

6. A microscope having a reflecting fluorescence illumination optical system according to claim 2 or 3, wherein the excited light supplied from said reflecting fluorescence illumination optical system is attenuated and observation images for right and left eyes are made substantially equal in contrast so that a stereoscopic fluorescence observation can be made.

7. A microscope having a reflecting fluorescence illumination optical system according to claim 5, wherein said optical member has a diffusion region on one surface thereof as means for making observation images for right and left eyes substantially equal in contrast.

8. A microscope having a reflecting fluorescence illumination optical system according to claim 2, wherein said transmitting illumination optical system has a condenser lens and said optical member is interposed between said specimen and said condenser lens.

9. A microscope having a reflecting fluorescence illumination optical system according to claim 2, wherein said transmitting illumination optical system has a condenser lens, said condenser lens including a first lens unit having an attenuation film for attenuating the excited light on a specimen-side surface thereof.

10. A microscope having a reflecting fluorescence illumination optical system according to claim 9, wherein said first lens unit having the attenuation film is movable in and out of an optical path of said transmitting illumination optical system and is replaceable with a second lens unit having an attenuation film of a spectral property different from that of said first lens unit.

11. A microscope having a reflecting fluorescence illumination optical system according to claim 8, wherein said optical member is movable in and out of an optical path of said transmitting illumination optical system and is replaceable with a second optical member for compensating a working distance between said specimen and said condenser lens.

12. A microscope having a reflecting fluorescence illumination optical system according to claim 8, wherein an emission of auto-fluorescent light from the condenser lens of said transmitting illumination optical system, caused by the excited light from said reflecting fluorescence illumination optical system, is suppressed to improve a contrast of a fluorescent image observed in a simultaneous observation with illumination by said transmitting illumination optical system.

13. A microscope having a reflecting fluorescence illumination optical system according to claim 2 or 3, wherein said optical member has properties of transmitting and attenuating the excited light.

14. A microscope having a reflecting fluorescence illumination optical system according to claim 2 or 3, wherein said optical member has properties of reflecting and attenuating the excited light and is placed so that reflected, excited light is prevented from entering said observation optical system.

15. A microscope having a reflecting fluorescence illumination optical system according to claim 1, wherein said optical member includes a plurality of optical members of different spectral transmittances, said plurality of optical members being interposed to be movable in and out of an optical path between said specimen and said specimen supporting means.

16. A microscope having a reflecting fluorescence illumination optical system according to claim 2, wherein said optical member includes a plurality of optical members of different spectral transmittances, said plurality of optical members being interposed to be movable in and out of an optical path between said specimen and said transmitting illumination optical system.

17. A microscope having a reflecting fluorescence illumination optical system according to claim 3, wherein said optical member includes a plurality of optical members of different spectral transmittances, said plurality of optical members being interposed to be movable in and out of an optical path between said specimen and a transmitting illumination optical system.

* * * * *